US012656465B2

(12) United States Patent
Dutton et al.

(10) Patent No.: US 12,656,465 B2
(45) Date of Patent: Jun. 16, 2026

(54) OPTOELECTRONIC DEVICE

(71) Applicants: STMicroelectronics (Research & Development) Limited, Marlow (GB); STMicroelectronics (Grenoble 2) SAS, Grenoble (FR)

(72) Inventors: Neale Dutton, Edinburgh (GB); Jonathan Steckel, Corenc (FR)

(73) Assignees: STMicroelectronics (Research & Development) Limited, Marlow (GB); STMicroelectronics (Grenoble 2) SAS, Grenoble (FR)

( * ) Notice: Subject to any disclaimer, the term of this patent is extended or adjusted under 35 U.S.C. 154(b) by 586 days.

(21) Appl. No.: 18/195,609

(22) Filed: May 10, 2023

(65) Prior Publication Data

US 2023/0375680 A1 Nov. 23, 2023

(30) Foreign Application Priority Data

May 17, 2022 (EP) ..................................... 22305725

(51) Int. Cl.
*G01S 7/4865* (2020.01)
*G01S 7/481* (2006.01)
*G01S 7/4863* (2020.01)
*G01S 7/499* (2006.01)
(Continued)

(52) U.S. Cl.
CPC .......... *G01S 7/4865* (2013.01); *G01S 7/4816* (2013.01); *G01S 7/4863* (2013.01); *G01S 7/499* (2013.01); *G06V 10/147* (2022.01); *G06V 40/166* (2022.01)

(58) Field of Classification Search
CPC .. G06V 10/147; G06V 40/166; G01S 17/894; G01S 7/4813; G01S 7/4816; G01S 7/484; G01S 7/4863; G01S 7/4865; G01S 7/499
See application file for complete search history.

(56) References Cited

U.S. PATENT DOCUMENTS

2017/0084776 A1* 3/2017 Gessner .............. H10F 77/1433
2019/0159309 A1 5/2019 Shimizu et al.
2020/0120299 A1* 4/2020 Li .......................... H04N 23/95
(Continued)

FOREIGN PATENT DOCUMENTS

EP 3620813 A1* 3/2020 .......... H01L 25/167
WO 2020221633 A1 11/2020

OTHER PUBLICATIONS

EPO Search Report and Written Opinion for priority application, EP Appl. 22305725.8, report dated Jan. 2, 2023, 15 pgs.
(Continued)

*Primary Examiner* — Md N Haque
(74) *Attorney, Agent, or Firm* — Crowe & Dunlevy LLC

(57) ABSTRACT

This disclosure relates to a time-of-flight sensor including, on a same base substrate, a light emitter configured to emit light into an image scene, a reference sensor configured to detect light emitted by the light emitter, and a signal reception sensor array separated from the light emitter by an optical barrier. The optical barrier is configured to prevent light emitted by the light emitter from directly reaching the signal reception sensor array, with the signal reception sensor array being configured to detect light reflected by the image scene. The reference sensor and the signal reception sensor array are based on semiconductor nanoparticles.

18 Claims, 8 Drawing Sheets

(51) Int. Cl.
  *G06V 10/147* (2022.01)
  *G06V 40/16* (2022.01)

(56) References Cited

U.S. PATENT DOCUMENTS

| | | | |
|---|---|---|---|
| 2020/0250403 A1 | 8/2020 | Shimizu et al. | |
| 2021/0373132 A1 | 12/2021 | Etschmaier et al. | |
| 2022/0137222 A1* | 5/2022 | Oh ........................ | H10F 39/802 |
| | | | 356/5.01 |
| 2023/0314615 A1* | 10/2023 | Mlinar .................... | G01S 17/89 |
| | | | 356/4.01 |

OTHER PUBLICATIONS

CN First Office Action and Search Report for counterpart CN Appl. No. 202310549725.5, report dated Apr. 7, 2026, 12 pgs.

\* cited by examiner

Fig. 1
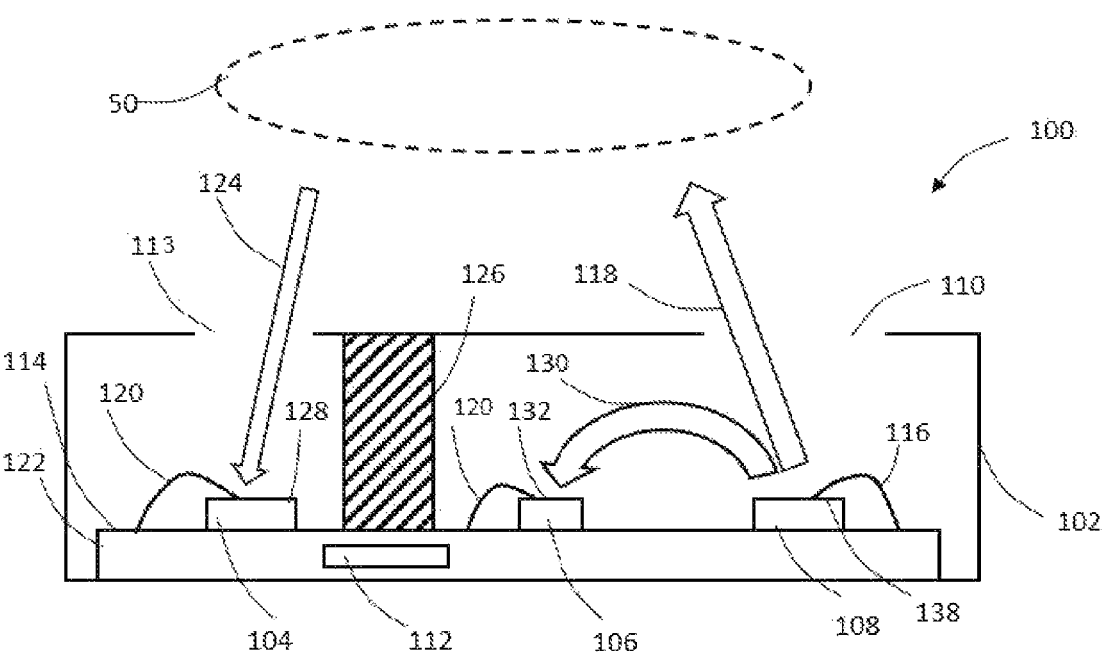
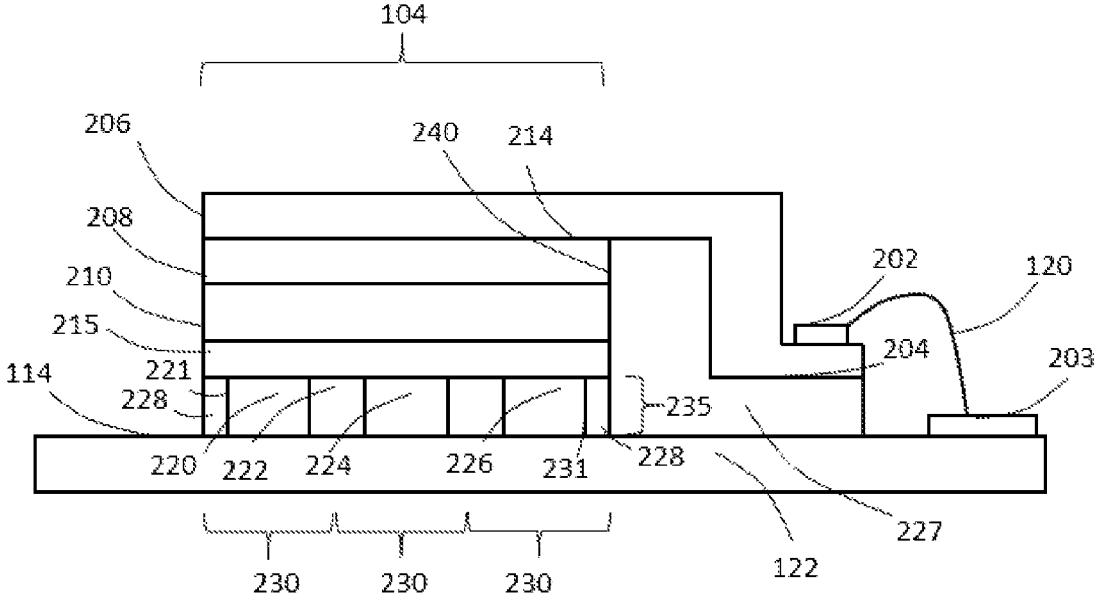
Fig. 2

Fig. 12          Fig. 13

OPTOELECTRONIC DEVICE

PRIORITY CLAIM

This application claims the priority benefit of European Application for Patent No. 22305725.8, filed on May 17, 2022, the content of which is hereby incorporated by reference in its entirety to the maximum extent allowable by law.

TECHNICAL FIELD

The present disclosure relates generally to the field of optoelectronic devices and, in particular, to time-of-flight sensors and related methods.

BACKGROUND

Time-of-flight sensors involve the use of an emitter, which emits light towards a scene in order to illuminate at least part of the scene, and a receiver sensor, which detects the reflected light returning from the scene. Bulk semiconductor materials, such as silicon or Group III-V materials, are generally employed to build single photon avalanche diodes (SPAD), which are often used in the receiver sensors. These bulk materials tend to be associated with a high dark current at room temperature. Silicon is also limited when the time-of-flight sensor is intended to operate in the short-wave infrared frequency band. Given this, further development is needed.

There is a need in the art to address drawbacks of known time-of-flight sensors resulting from the use of the above described materials.

SUMMARY

One embodiment provides a time-of-flight sensor including, on a same base substrate, a light emitter configured to emit light into an image scene, a reference sensor configured to detect light emitted by the light emitter, and a signal reception sensor array separated from the light emitter by an optical barrier. The optical barrier is configured to prevent light emitted by the light emitter from directly reaching the signal reception sensor array, with the signal reception sensor array being configured to detect light reflected by the image scene. The reference sensor and the signal reception sensor array are based on semiconductor nanoparticles.

One embodiment provides a method of manufacturing a time-of-flight sensor including the formation, on a same base substrate, of a light emitter configured to emit light into an image scene, a reference sensor configured to detect light emitted by the light emitter, and a signal reception sensor array separated from the light emitter by an optical barrier. The optical barrier is configured to prevent light emitted by the light emitter from reaching directly the signal reception sensor array, with the signal reception sensor array being configured to detect light reflected by the image scene. The reference sensor and the signal reception sensor array are based on semiconductor nanoparticles.

According to an embodiment, the light emitter may be based on semiconductor nanoparticles.

According to an embodiment, the light emitter may be a vertical-cavity surface-emitting laser.

According to an embodiment, the signal reception sensor array may include a plurality of pixels, and the reference sensor and each pixel of signal reception sensor array may include a semiconductor nanoparticle layer formed of InSb, $InAs_xP_x$ or InAs or $InAs_xSb_x$.

According to an embodiment, each of the sensors may include a layer of semiconductor nanoparticles, a hole transport layer, an electron transport layer and electrodes.

According to an embodiment, the hole transport layer may include molybdenum oxide and/or the electron transport layer comprises zinc oxide.

According to an embodiment, the signal reception sensor and/or the reference sensor may include a matrix of pixels, with each pixel having a first electrode and a second electrode. The first electrodes of the pixels of the signal reception sensor and/or of the reference sensor may include a partially transparent and conductive layer common to all pixels, the second electrodes being insulated from the second electrode of each other pixel of the signal reception sensor and/or of the reference sensor.

According to an embodiment, the partially transparent and conductive layer may be common to both the signal reception sensor and the reference sensor.

According to an embodiment, the reference sensor may include a first device substrate and the signal reception sensor comprises a second device substrate, the first and second device substrates being mounted on the base substrate.

According to an embodiment, the partially transparent and conductive layer of the signal reception sensor and of the reference sensor may be different and insulated from each other. The sensor may include at least one polarization circuit configured to apply a first voltage between the first electrode and the second electrode of pixels of the reference sensor and apply a second voltage between the first electrode and the second electrode of the pixels of the signal reception sensor, the first voltage being different from the second voltage.

Another embodiment provides a mobile communication device include a touch display screen and comprising such a sensor, with the touch display screen covering the sensor.

According to an embodiment, the touch display screen may be an organic light emission diode display.

Another embodiment may be face-ID sensor comprising a such sensor.

Another embodiment provides a method of using such sensor to measure a time-of-flight, including applying, by the polarization circuit, the first voltage between the first electrode and the second electrode of the pixels of the reference sensor and applying the second voltage, different from the first voltage, between the first electrode and the second electrode of the pixels of the signal reception sensor. The method further includes modifying the first voltage, as function of a signal output of the reference sensor and/or modifying the second voltage as function of a signal output of the signal reception sensor.

BRIEF DESCRIPTION OF THE DRAWINGS

The foregoing features and advantages, as well as others, will be described in detail in the following description of specific embodiments given by way of illustration and not limitation with reference to the accompanying drawings, in which:

FIG. 1 is a cross-sectional schematic view of an optoelectronic device according to an example embodiment of the present disclosure;

FIG. 2 is a zoomed cross-sectional view of a signal reception sensor or a reference sensor of FIG. 1 according to an example embodiment of the present disclosure;

FIG. 12 is a graph illustrating time domain pile up distortion; and

FIG. 13 is a graph illustrating mitigation of time domain pile up distortion.

DETAILED DESCRIPTION

Figures 3, 4:
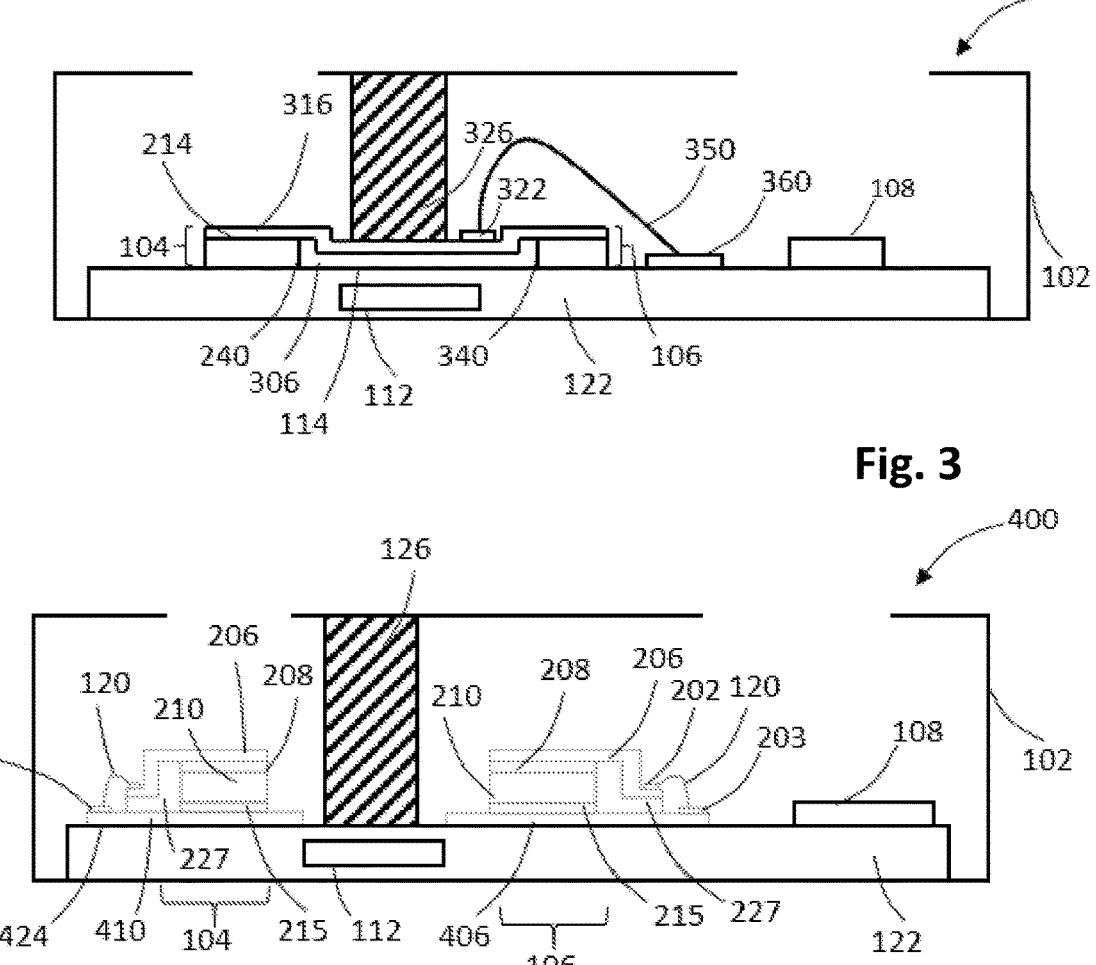
FIG. 3 is a cross-sectional schematic view of an opto-electronic device according to another example embodiment of the present disclosure.
FIG. 4 is a cross-sectional schematic view of an opto-electronic device according to another example embodiment of the present disclosure.

Like features have been designated by like references in the various figures. In particular, the structural and/or functional features that are common among the various embodiments may have the same references and may dispose identical structural, dimensional, and material properties.

For the sake of clarity, the operations and elements that are useful for an understanding of the embodiments described herein have been illustrated and described in detail.

Unless indicated otherwise, when reference is made to two elements connected together, this signifies a direct connection without intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

FIG. 1 is a cross-sectional schematic view of an optoelectronic device 100 according to an example embodiment of the present disclosure.

The optoelectronic device 100 is for example a time-of-flight (ToF) sensor, in other words, the device aims at measuring distances by ToF. For example, the device 100 is a direct ToF sensor. For example, the optoelectronic device 100 is configured to be used in an imager or image sensor, in order to generate depth images, sometimes referred to as depth maps, representing the scene.

The optoelectronic device 100 of FIG. 1 comprises, for example, a base substrate 122. The base substrate 122 is, for example, a silicon substrate such as a silicon integrated circuit or a silicon chip or a printed circuit board or other type of substrate.

The optoelectronic device 100 for example comprises, mounted on a surface 114, such as an upper surface, of the base substrate 122, a light emitter 108, which is configured to emit light 118 into an image scene 50 and, for example, towards a reference sensor 106. The reference sensor 106 is also for example mounted on the surface 114, and is configured to detect light emitted by the light emitter 108.

The optoelectronic device 100 also comprises, for example, a signal reception sensor 104 mounted on the surface 114. The signal reception sensor 104 is, for example, separated from the light emitter 108 by an optical barrier 126.

The base substrate 122 also, for example, comprises a control circuit 112. The control circuit 112 is, for example, coupled to the light emitter 108, to the reference sensor 106 and to the signal reception sensor 104, via connection pads (not illustrated) positioned on the surface 114 of the base substrate 122.

The optical barrier 126 is configured, for example, to prevent light emitted by the light emitter 108 from directly reaching the signal reception sensor 104. In the example of the FIG. 1, the optical barrier 126 is arranged between the upper surface 114 of the base substrate 122 and an inner surface of a packaging unit 102 in which the base substrate 122 is, for example, fixed. In this example, the optical barrier 126 is further arranged between the signal reception sensor 104 and the reference sensor 106. The packaging unit 102 comprises, for example, first and second apertures 110, 113.

The first aperture 110 is, for example, configured to provide a transparent opening through which at least part of the light emitted by the light emitter 108 is allowed to pass in order to illuminate the image scene 50. The first aperture 110 is for example aligned with an emitting surface of the light emitter 108. The first aperture 110 is for example filled by a transparent window, diffuser or lens (not illustrated) formed for example of glass.

The second aperture 113 is, for example, configured to provide an opening allowing return light 124, emitted by the light emitter 108 and reflected by the scene 50, to enter the packaging unit 102.

The reference photodetector 106 is, for example, arranged in the packaging unit 102 in a way to receive light emitted by the emitter, for example, by a direct light path and/or by reflection 130 on an inner surface of the packaging unit 102.

The signal reception sensor 104 has, for example, two or more electrodes. In an example, a top electrode is arranged on a top surface 128 of the signal reception sensor 104. The top electrode is, for example, connected to a connection pad of the base substrate 122 via a bonding wire 120. One or more other electrodes of the signal reception sensor 104 are, for example, arranged on an underside of the signal reception sensor 104 and coupled, via one or more connection pads of the base substrate 122, to the control circuit 112.

The reference sensor 106 has, for example, two or more electrodes. In an example, a top electrode is arranged on a top surface 132 of the reference sensor 106. The top electrode is, for example, connected to a connection pad of the base substrate 122 via a bonding wire 120. One or more other electrodes of the reference sensor 106 are, for example, arranged on an underside of the reference sensor and coupled, via one or more connection pads of the base substrate 122, to the control circuit 112.

The light emitter 108 has, for example, two or more electrodes. In an example, a top electrode is arranged on a top surface 138 of the light emitter 108. The top electrode is, for example, connected to a connection pad of the base substrate 122 via a bonding wire 116. One or more other electrodes of the light emitter 108 are, for example, arranged on an underside of the light emitter 108 and coupled, via one or more connection pads of the base substrate 122, to the control circuit 112.

According to one example, the reference sensor 106 and/or the signal reception sensor 104 are based on semiconductor nanoparticles. More particularly, the reference sensor 106 and/or the signal reception sensor 104 for example each comprise a layer, or multiple layers, of semiconductor nanoparticles.

The light emitter 108 is, for example, based on semiconductor nanoparticles. More particularly, the light emitter 108 for example comprises a layer, or multiple layers, of semiconductor nanoparticles. In another example, the light emitter 108 is a vertical cavity surface emitting laser (VCSEL).

The reference sensor 106 for example comprises one or more pixels. The signal reception sensor 104 is for example formed of an array of pixels.

Each pixel of the reference sensor 106 and of the signal reception sensor 104, and the light emitter 108 in the case that it is based on semiconductor nanoparticles, for example comprises a stack of layers comprising, from the base substrate, an electrode, for example in the form of an interconnection arranged in the base substrate or on the base substrate surface, an optional electron transport layer, a semiconductor nanoparticles layer, an optional barrier against moisture, an optional hole transport layer and an electrode. Several layers of the reference sensor 106, of the signal reception sensor 104 and of the emitter 108 are at least partially transparent to the wavelengths of the light emitted by the emitter. More particularly, the layers located between the semiconductor nanoparticles layer and the scene are at least partially transparent to the wavelengths of the light emitted by the emitter.

A semiconductor nanoparticle is a nanoscopic material structure which, given an electrical excitation corresponding to its bandgap, emits photons due to the production and subsequent recombination of election-hole pairs inside the semiconductor nanoparticles. Similarly, electron-hole pairs can be produced given the incidence of photons onto the nanoscopic material structure. In this manner, it is possible to create emitting elements such as LEDs (Light Emitting Diodes) for example, and detecting elements such as photodetectors for example, on the basis of semiconductor nanoparticles.

A semiconductor nanoparticle comprises a semiconductor core. The dimensions or size, composition, and shape of the core determine the wavelength of the emitted light, if the semiconductor nanoparticle is part of a light emitter, or the wavelength of the light absorbed generating the election-hole pairs, if the semiconductor nanoparticle is part of a photodetector. A semiconductor nanoparticle can also comprise a shell, preferably of a semiconductor material, surrounding the core in order to protect and passivate the core. A semiconductor nanoparticle for example further comprises ligands, organic aliphatics, organometallic, or inorganic molecules that extend from the shell and passivate, protect, and functionalize the semiconductor surface.

The semiconductor nanoparticles of the semiconductor nanoparticle layer or layers of the reference sensor 106, of the signal reception sensor 104, and of the emitter 108, can be among several types of semiconductor nanoparticles. For example, the semiconductor nanoparticles can be quantum dots, in other words a type of semiconductor nanoparticle with a core substantially spherical. The semiconductor nanoparticles can also be quantum wires, or quantum rods, in other words a type of semiconductor nanoparticle with a core having an extended form in one direction, for example substantially the form of a cylinder. The semiconductor nanoparticles can also be quantum wells, in other words a type of semiconductor nanoparticle with a core having substantially the form of a layer, in other words the form of a parallelepiped.

The core is, for example, made of a material among the following or an alloy of materials among the following: CdSe, CdS, CdTe, CdSeS, CdTeSe, AgS, ZnO, ZnS, ZnSe, CuInS, CuInSe, CuInGaS, CuInGaSe, PbS, PbSe, PbSeS, PbTe, InAsSb, InAs, InSb, InGaAs, InP, InGaP, InAlP, InGaAlP, InZnS, InZnSe, InZnSeS, HgTe, HgSe, HgSeTe, Ge, Si. The shell is, for example, made of a material among the following or an alloy of materials among the following: CdSe, CdS, CdTe, CdSeS, CdTeSe, AgS, ZnO, ZnS, ZnSe, CuInS, CuInSe, CuInGaS, CuInGaSe, PbS, PbSe, PbSeS, PbTe, InAsSb, InAs, InSb, InGaAs, InP, InGaP, InAlP, InGaAlP, InZnS, InZnSe, InZnSeS, HgTe, HgSe, HgSeTe, Ge, Si. The choice of the materials depends on the desired wavelength.

According to some embodiments, the semiconductor nanoparticle layer or layers of the reference sensor 106, of the signal reception sensor 104, and of the emitter 108 in the case that it is a semiconductor nanoparticle emitter, are for example formed of InAs or InSb or $InAs_xP_x$ or $InAs_xSb_x$. Indeed, the Inventors have found that these materials are particularly advantageous for time-of-flight devices due to the relatively high speed at which charges are photogenerated in these materials and transported to the pixel electrode. Furthermore, both materials have good absorption in the short-wave infrared (SWIR) range, InAs for example being particularly sensitive to light in the wavelength range 800 nm to 1600 nm, and InAsSb being particularly sensitive to light in the wavelength range 1000 nm to 5000 nm.

For SWIR light sensing or light emission, meaning wavelength between 1 µm and 2.5 µm, preferably, the dimensions of the core are lower than 20 nm, for example in the range from 2 to 15 nm. In the case of quantum dots, the diameter of each quantum dot is preferably in the range from 2 to 15 nm. For example, the semiconductor nanoparticles of the reference sensor 106, of the signal reception sensor 104, and/or of the emitter 108, comprise quantum dots of octahedron shape each having a diameter of between 1 and 3 nm, of truncated octahedron shape each having a diameter of between 3 and 4 nm, or of cuboctahedron shape each having a diameter of 4 nm or more, and for example of between 4 and 7 nm.

By using semiconductor nanoparticles and by comparing a light level received by the signal reception sensor 104 to a signal output of the reference sensor 106, a time-of-flight sensor operating in the SWIR is, for example, obtained.

Further details of a semiconductor nanoparticle-based light emitter and sensor suitable for implementing the light emitter 110 and/or sensors 106, 108 of FIG. 1 are described in United States Patent Application Publication No. 2022/0165797, the contents of which are incorporated by reference in their entirety to the maximum extent allowable under the law.

FIG. 2 is a zoomed cross-sectional view of an example of the signal reception sensor 104 of FIG. 1 according to an example embodiment of the present disclosure. The reference sensor 106 of FIG. 1 is for example implemented by a similar structure.

In the example of FIG. 2, the signal reception sensor 104 comprises an array of pixels 230. The pixels 230 for example comprise a top electrode 202, which is common for all of the pixels, and is for example wire bonded to a connection pad 203 of the base substrate 122. The pixels 230 are for example formed of a stack comprising, in order from the top electrode 202 to the base substrate 122, a partially transparent and conductive layer 206 common to each of the pixels 230, an optional hole transport layer 208 common to each of the pixels 230, an optional and non-illustrated moisture barrier common to each of the pixels 230, a semiconductor nanoparticle layer 210 common to each of the pixels 230, an optional electron transport layer 215, and a lower electrode layer 235 comprising a lower electrode per pixel 230, with three such lower electrodes 220, 224 and 226 being illustrated in FIG. 2. According to one example, the partially transparent and conductive layer 206 is an indium tin oxide (ITO) layer, the hole transport layer 208 is a molybdenum oxide $MoO_3$ layer, the moisture barrier is an aluminum oxide $Al_2O_3$ layer, the electron transport layer 215 is made of zinc oxide, and the lower electrodes 220, 224 and 226 are each formed by optional diffusion barrier layers of titanium or titanium nitride and/or tantalum or tantalum nitride laying on a copper pillar.

The partially transparent and conductive layer 206 for example lies on a top surface 214 of the hole transport layer 208. In the example of FIG. 2, an insulating material portion 227 is arranged in contact with a lateral face 240 of the stack constituted by the layers 208, 210 and 215, as well as a part of an upper surface 114 of the base substrate 122 that is adjacent to the stack constituted by the layers 208, 210 and 215. In this example, the partially transparent and conductive layer 206 is, for example, further arranged to cover the insulating material portion 227. The top electrode 202 is, in this example, positioned on a portion of the partially transparent and conductive layer 206 that covers the insulating material portion 227.

The electron transport layer 215 of each of the pixels 230 is, for example, connected to a corresponding one of the lower electrodes 220, 224, 226. Each lower electrode 220, 224, 226 is for example connected to a connection pad positioned for example on the upper surface 114 of the base substrate 122. Lower electrodes 220, 224, 226 are, for example, copper pillars. According to an example embodiment, the copper pillars are topped with a diffusion barrier comprising for example titanium nitride and/or tantalum nitride and/or an alloy comprising nickel. In other words, the diffusion barrier for example provides the interface between the copper pillars of the lower electrodes 220, 224, 226 and the electron transport layer 215. According to an example embodiment, the lower electrodes 220, 224, 226 are electrically insulated from each other by an insulating layer 222, for example of silicon dioxide. Adjacent pixels 230 are, for example, laterally defined by the space between adjacent lower electrodes 220, 224, 226. An insulating layer 228 for example covers lateral faces 221, 231 of those lower electrodes that are oriented towards the exterior of the device (the electrodes 220 and 226 in the example of FIG. 2). According to an example, the lower electrodes are formed in the base substrate, for example when the base substrate is a silicon chip. According to an example, the insulating layer 228 is silicon dioxide or a low-k insulator.

The layer 210 comprising the semiconductor nanoparticles is for example sandwiched between the optional electron transport layer 215 and the optional hole transport layer 208. The hole transport layer 208 for example comprises molybdenum oxide or nickel oxide or copper oxide. The electron transport layer 215 for example comprises zinc oxide or titanium oxide or doped zinc oxide or doped titanium oxide. According to an example, the layer of semiconductor nanoparticles is sandwiched between a barrier layer, formed for example of a layer of titanium and/or a layer of tantalum arranged on a copper electrode, and an aluminum oxide $Al_2O_3$ layer of less than 2 nm in thickness. The aluminum oxide $Al_2O_3$ layer is for example covered by a Molybdenum oxide $MoO3$ layer, which is in turn covered, for example, by an indium tin oxide layer.

As mentioned above, according to one example, the layer 210 comprising the semiconductor nanoparticles, the hole transport layer 208, and the partially transparent and conductive layer 206 are common to each of the pixels 230. According to another example, the electron transport layer 215 is localized on each lower electrode or on the diffusion barrier covering the top of the lower electrodes. According to another example, the electron transport layer 215 is common to each of the pixels 230. Thus, the pixel boundaries between adjacent pixels 230 are defined by the arrangement of the lower electrodes 220, 224, 226, and in particular the distance separating two adjacent ones of the lower electrodes 220, 224, 226. Once an electron-hole pair is created in the semiconductor nanoparticles layer 210, a charge is transported towards the closest lower electrode 220, 224, 226. With several incoming photons, corresponding to return light, several electron-hole pairs are created and transported to the various lower electrodes 220, 224, 226.

In another non-illustrated example, microlenses are arranged on top of the partially transparent and conductive layer 206. Each microlens is, for example, approximatively aligned with a corresponding lower electrode 220, 224, 226 so as to focus the incoming photons towards zones of the semiconductor nanoparticle layer 210 aligned with corresponding ones of the lower electrodes 220, 224, 226.

The partially transparent and conductive layer 206 is for example made of indium tin oxide or doped zinc oxide or semi-transparent metal or graphene. The electrode 202 and the connection pad allow a voltage to be applied, by the control circuit 112, between the anode and the cathode of the reference sensor 106 and/or the signal reception sensor 104, in other words between the top electrode 202 and the lower electrodes 220, 224, 226. The control circuit 112 is for example configured to detect a current flowing through each lower electrode 220, 224, 226 in order to detect light arriving at each pixel.

FIG. 3 is a cross-sectional schematic view of an optoelectronic device 300 according to another example embodiment of the present disclosure.

The optoelectronic device 300 for example has some features that are similar to the optoelectronic device 100 of FIG. 1, and comprises in particular a similar base substrate 122, packaging unit 102 and light emitter 108. In the example of FIG. 3, the signal reception sensor 104 and/or the reference sensor 106 have, for example, a hole transport layer, a semiconductor nanoparticle, an electron transport layer, and a lower electrode layer similar respectively to the layers 208, 210, 215 and 235 of the example of FIG. 2.

In the example of FIG. 3, the signal reception sensor 104 and the reference sensor 106 are part of a same unit, an insulating material portion 306 covering the lateral face 240 of the signal reception sensor 104 as well as a lateral face 340 of the reference sensor 106 and a portion of the upper face 114 of the base substrate 122 located between the lateral faces 240 and 340. In the example of FIG. 3, a partially transparent and conductive layer 316 is, for example, arranged as in the example of the FIG. 2 as a top layer of the stack of the signal reception and reference sensors, and is also for example arranged to cover the insulating material portion 306 between the signal reception sensor 104 and the reference sensor 106. Thus, the layer 316 for example forms a single layer that is common to both the signal reception and reference sensors 104, 106.

While in the embodiment of FIG. 3 both the signal reception sensor 104 and the reference sensor 106 comprise arrays of pixels 230, in a non-illustrated example, the signal reception sensor 104 is implemented as an array of pixels 230 and the reference sensor 106 has a single lower electrode instead of an array of lower electrodes, and thus the reference sensor 106 comprises a single light receiving area.

In the example of FIG. 3, a top electrode 322 is arranged on and connected to the partially transparent and conductive layer 316 so that one single electrode serves for both the signal reception sensor 104 and the reference sensor 106. A wire bond connection 350 for example electrically connects the top electrode 322 to a connection pad 360 of the base substrate 122. The wire bonding of the light emitter 108 to the base substrate 122 is for example similar to the example of FIG. 1 and is not illustrated in FIG. 3 for clarity reasons.

In the example of FIG. 3, the optical barrier 326 is arranged between an upper surface of the partially transparent and conductive layer 316 and an inner face of the packaging unit 102.

FIG. 4 is a cross-sectional schematic view of an optoelectronic device 400 according to another example embodiment of the present disclosure.

The optoelectronic device 400 for example has some features that are similar to the optoelectronic device 100 of FIG. 1, and comprises in particular a similar packaging unit 102, optical barrier 126, light emitter 108 and base substrate 122. The signal reception sensor 104 is similar to the example of FIG. 2, except that the lower electrode layer 235 is comprised in a device substrate 410 which is, for example, mounted on the upper face 114 of the base substrate 122. The signal reception sensor 104 is, for example, assembled with the device substrate 410 remotely and then the device substrate 410 is mounted on the base substrate 122. The reference sensor 106 is, for example, similar to signal reception sensor 104 of FIG. 2, except that its lower electrode layer 235 is comprised in a device substrate 406 which is, for example, mounted on the upper face 114 of the base substrate 122. The reference sensor 106 is, for example, assembled with the device substrate 406 remotely and then the device substrate 406 is mounted on the base substrate 122.

The top electrode 202 of the signal reception sensor 104 and respectively of the reference sensor 106 are similar to the example of FIG. 2 and connected, for example via a corresponding wire bond, to the respective connection pads 203. Each connection pad 203 is, for example, arranged on an upper surface of the device substrate 410, respectively 406 or, in a non-illustrated example, on the upper surface 114 of the base substrate 122.

Figure 5:
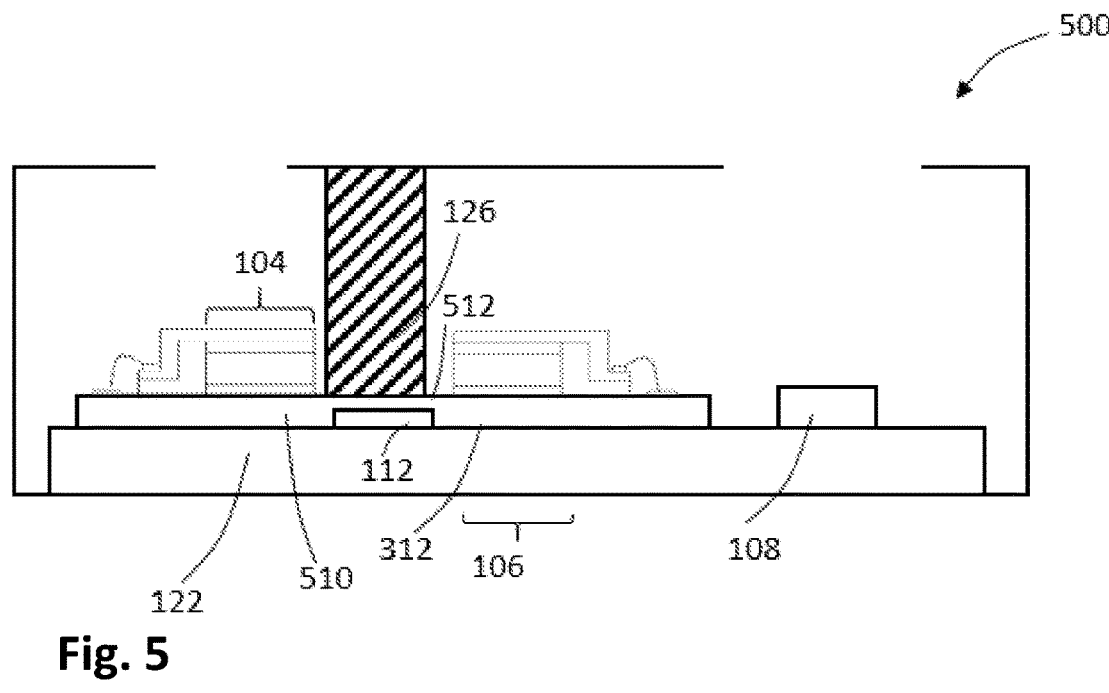
FIG. 5 is a cross-sectional schematic view of an opto-electronic device according to another example embodiment of the present disclosure.

FIG. 5 is a cross-sectional schematic view of an optoelectronic device 500 according to another example embodiment of the present disclosure.

The optoelectronic device 500 is, for example, similar to the optoelectronic device 400 of FIG. 4, except that, rather than being comprised within the device substrates 410, 406 respectively, the lower electrodes 220, 224, 226 and the insulating layers 222, 228 of the signal reception sensor 104 and of the reference sensor 106 are comprised in a same device substrate 510 which is, for example, mounted on the upper face 114 of the base substrate. The signal reception sensor 104 and the reference sensor 106 are, for example, assembled on the device substrate 510 remotely and then mounted on the base substrate 122. In the example of FIG. 5, the control circuit 112 is, for example, comprised in the device substrate 510.

The optical barrier 126 of FIG. 5 is for example arranged between an upper face 512 of the device substrate 510 and the inner face of the packaging unit 102.

The optoelectronic device 500 allows obtaining the signal reception sensor 104 and the reference sensor 106 to be implemented in a first technology that is different from the technology used for obtaining the light emitter 108.

Figure 6:
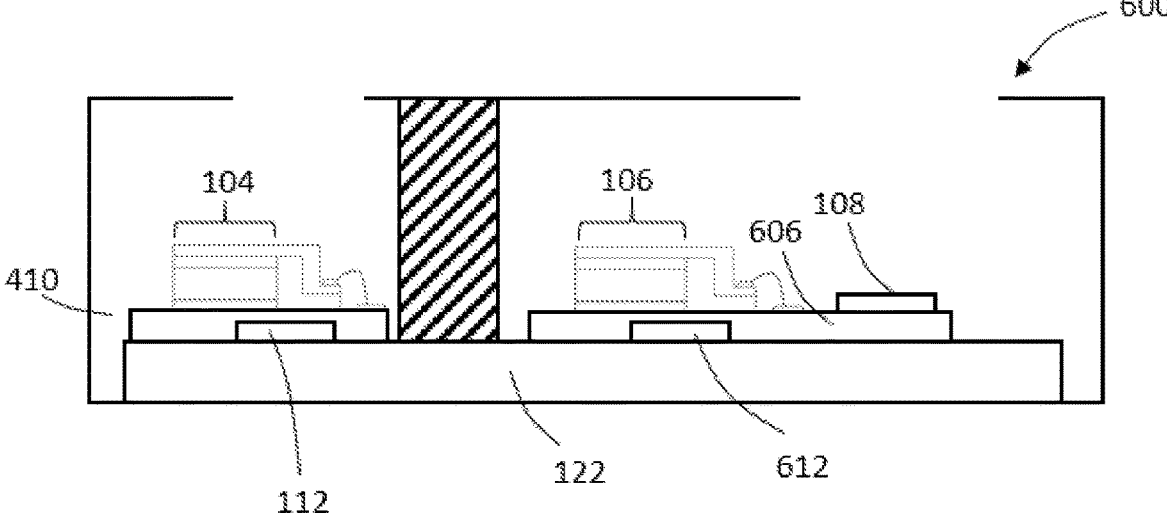
FIG. 6 is a cross-sectional schematic view of an opto-electronic device according to yet another example embodiment of the present disclosure.

FIG. 6 is a cross section schematic view of an optoelectronic device 600 according to yet another example embodiment of the present disclosure.

The optoelectronic device 600 is similar to the optoelectronic 400 of FIG. 4, except that the control circuit 112 is not comprised in the base substrate 122. Instead, the device substrate 410 comprises the control circuit 112, which is, for example, arranged to control the signal reception sensor 104. The reference sensor 106 is for example mounted on another device substrate 606, which comprises a control circuit 612. The control circuit 612 is arranged, for example, to control the reference device 106. In the example of FIG. 6, the light emitter 108 is, for example, mounted on the same device substrate 606 as the reference sensor 106. The control circuit 612 is, for example, arranged to control the light emitter 108.

Figure 7:
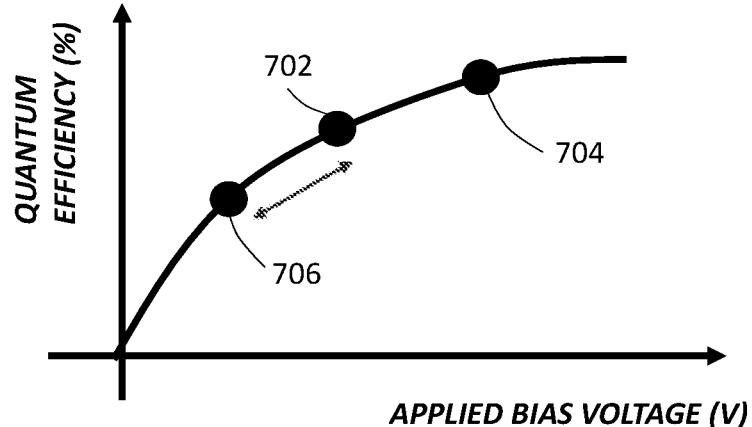
FIG. 7 is a graph representing the quantum efficiency of the signal reception sensor and the reference sensor as function of their applied bias voltage.

FIG. 7 is a graph representing the quantum efficiency (QUANTUM EFFICIENCY (%)) of the signal reception sensor 104 and the reference sensor 106 as function of the bias voltage (APPLIED BIAS VOLTAGE (V)) applied between their top electrode and their lower electrodes. It can be seen that, the higher the bias voltage, the higher the quantum efficiency, although the quantum efficiency reaches a plateau above a certain voltage. Furthermore, higher biasing voltages result in higher energy consumption.

The bias voltages applied to the signal reception sensor 104 and the reference sensor 106 are for example controlled in order to obtain a suitable tradeoff between quantum efficiency and energy consumption.

In a first example, the signal reception sensor 104 and the reference sensor 106 are biased by a same bias voltage. This is for example the case in at least the embodiment of FIG. 3 in which the sensors 104, 106 share a common top electrode 322 and a common partially transparent and conductive layer 316. In such a case, the sensors 104 and 106 are for example operated at a same first operating point 702 representing a mid-value of the applied voltage.

In a second example, the signal reception sensor 104 and the reference sensor 106 are biased by different bias voltages. This is for example possible in the embodiments of FIGS. 1, 4, 5 and 6, in which the sensors 104, 106 are separate and do not share a common top electrode 202 or layer 206. In such a case, the signal reception sensor 104 is for example operated at a second operating point 104, at which the bias voltage is for example higher than that of the first operating point 702, thus leading to a relatively high sensitivity level of the signal reception sensor 104. In some embodiments, this bias voltage is adjusted, independently of the bias voltage of the reference sensor 106, in order to obtain a desired signal to noise ratio (SNR) and distance linearity without saturating the return array. The reference sensor 106 is for example operated at a third operating point 706, at which the applied bias voltage is for example lower than that of the first operating point 702. In some embodiments, the third operating point of the reference sensor 106 is variable and is controlled by a feedback loop. It will be noted that, in the various embodiments, the reference sensor 106 is arranged on the side of the light emitter 108 and is not optically insulated from the light emitter 108. The amount of light received by the reference sensor 106 from the light emitter 108 is thus higher than the amount of return light received by the signal reception sensor 104. Decreasing the voltage bias of the reference sensor 106 allows a reduction in the risk of saturation of the reference sensor 106, thereby improving linearity and the signal on noise ratio. Furthermore, it leads to a reduction in the consumption of the reference sensor 106.

Figure 8:
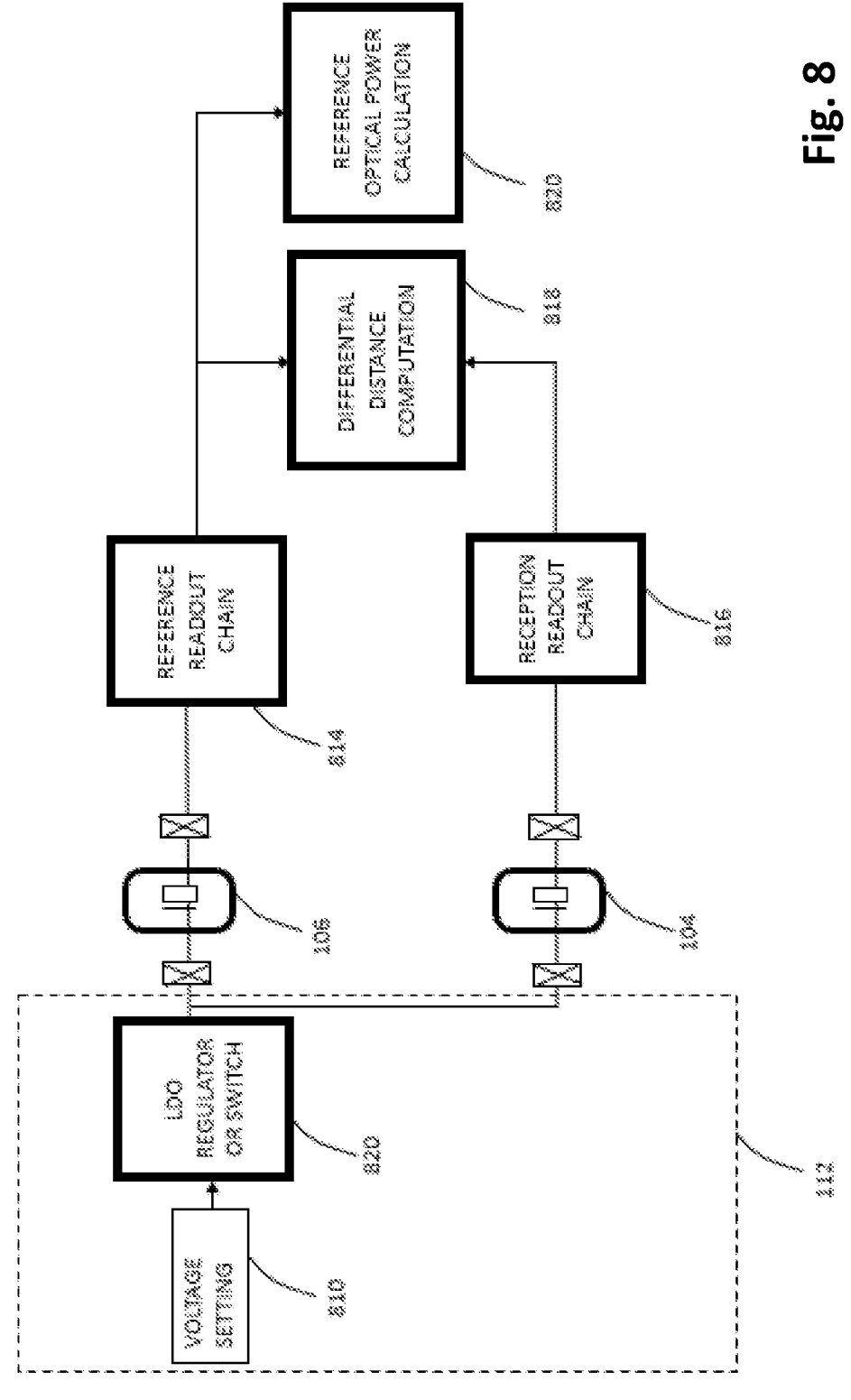
FIG. 8 is a block diagram illustrating functional blocks of the optoelectronic device of FIG. 1 or 3 according to a method of use of the optoelectronic device.

FIG. 8 is a block diagram illustrating functional blocks of the optoelectronic device of FIG. 1 or 3 according to a method of use of the optoelectronic device 100, 300.

In the example of FIG. 8, a voltage setting 810 (VOLTAGE SETTING) of the bias voltage, which is for example a fixed level, is for example, applied to a low drop out (LDO) regulator or switch 820 (LDO REGULATOR OR SWITCH) to obtain, at an output of the LDO regulator or switch 820, a regulated bias voltage. The voltage setting 810 is for example supplied by part of the control circuit 112, and the LDO regulator or switch 820 for example forms part of the control circuit 112.

The regulated bias voltage at the output of the LDO regulator or switch 820 is supplied to the signal reception sensor 104 and the reference sensor 106, for example, to the partially transparent and conductive layer 206 (FIG. 2) or 316 (FIG. 3).

The light signal received by the reference sensor 106 leads to a reference signal output, which is measured by a dedicated readout chain 814 (REFERENCE READOUT CHAIN).

The light signal received by the signal reception sensor 104 leads to a return signal output which is measured, for example, by a dedicated readout chain 816 (RECEPTION READOUT CHAIN).

In an example, the readout chains 814 and 816 form part of the control circuit 112.

The signals measured by the readout chains 814 and 816 are then compared and used to compute a differential distance 818 (DIFFERENTIAL DISTANCE COMPUTATION), for example, by computing the time of flight. For example, the light emitter 108 is configured to emit pulses of light, and the readout chains 814 and 816 are configured to detect a reception time of the light pulses respectively received by the reference and reception readout chain 814, 816. The differential distance computation 818 for example involves computing a time difference in the reception times of a given light pulse by the signal reception and reference sensors 104, 106.

In an example, the signal read out from the reference sensor 106 is further analyzed 820 (REFERENCE OPTICAL POWER CALCULATION), for example to calculate an optical power of the light emitted by the light emitter 108. The optical power of light emitted by the light emitter 108 is, for example, monitored for safety reasons.

In an example, the differential distance measurement 818 and/or the reference optical power calculation 820 are implemented by the control circuit 112.

Figure 9:
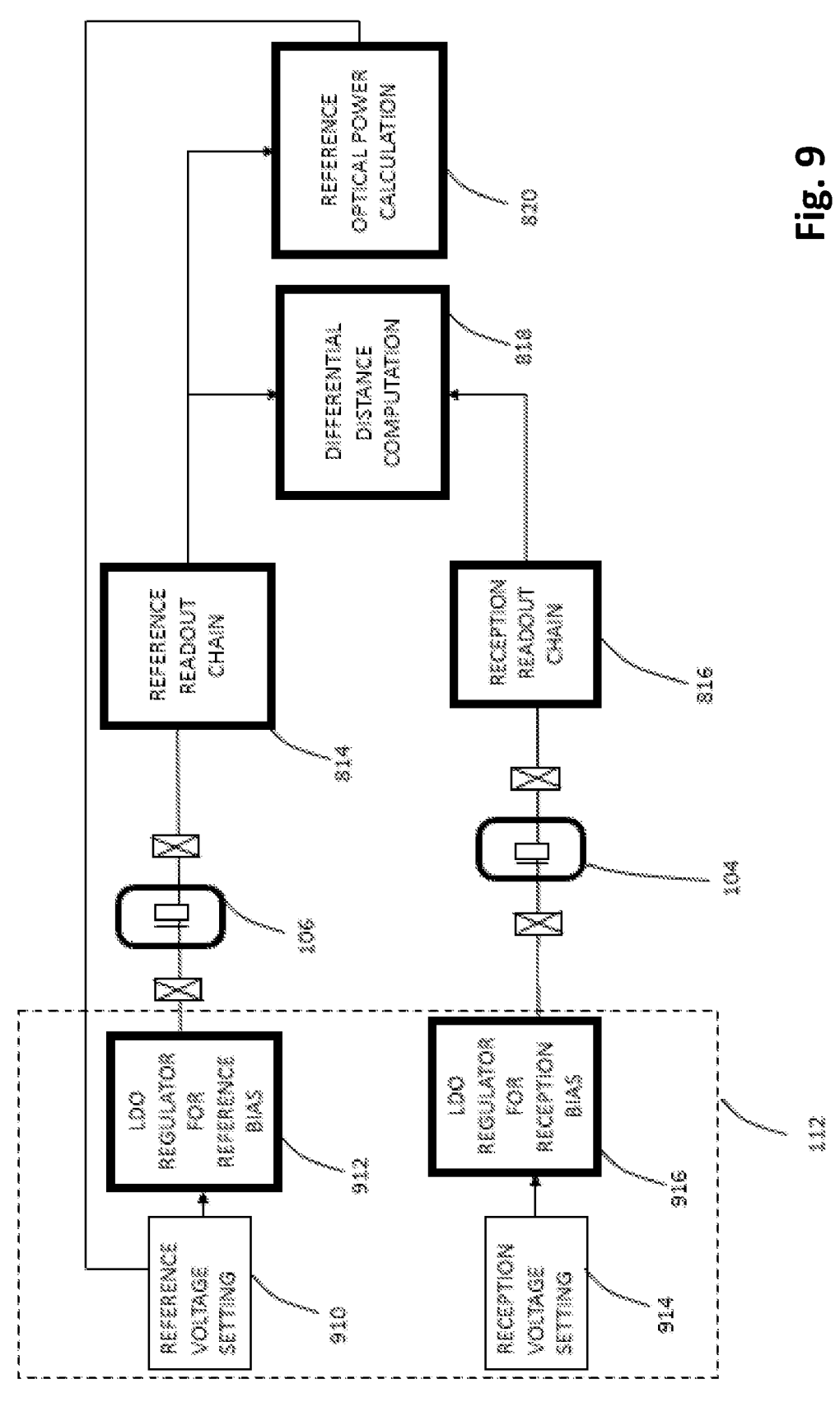
FIG. 9 is a block diagram illustrating functional blocks of the optoelectronic device of FIG. 4, 5 or 6 according to a method of use of the optoelectronic device.

FIG. 9 is a block diagram illustrating functional blocks of the optoelectronic device of FIG. 4, 5 or 6 according to a method of use of the optoelectronic device 400, 500 or 600.

The example of FIG. 9 is similar to the example FIG. 8, except that the LDO regulator or switch 820 is replaced by LDO regulators 912 and 916, which allow different bias voltages to be applied to the reference sensor 106 and to the signal reception sensor 104. The different bias voltages are for example applied to the respective partially transparent and conductive layer 206 of the reference sensor 106 and signal reception sensor 104. In the example of FIG. 9, a bias voltage setting 910 (REFERENCE VOLTAGE SETTING) is for example supplied to the LDO regulator 912 (LDO REGULATOR FOR REFERENCE BIAS) to obtain a first regulated bias voltage. The reference sensor voltage bias setting is modified, for example, according to the optical power calculation performed in a previous calculation. For example, if the optical power is found to be higher than a certain threshold, which for example risks leading to saturation of the reference sensor 106, the reference bias voltage setting 910 is for example reduced accordingly in order to reduce the sensitivity of the reference sensor 106. In the example of FIG. 9, another voltage bias setting 914 (RECEPTION VOLTAGE SETTING) is for example supplied to the LDO regulator 916 (LDO REGULATOR FOR RECEPTION BIAS) to obtain a regulated bias voltage, which is applied to the signal reception sensor 104.

The voltage settings 910 and 914 are for example supplied by part of the control circuit 112, and the LDO regulators 912, 916 for example forms part of the control circuit 112.

Figure 10:
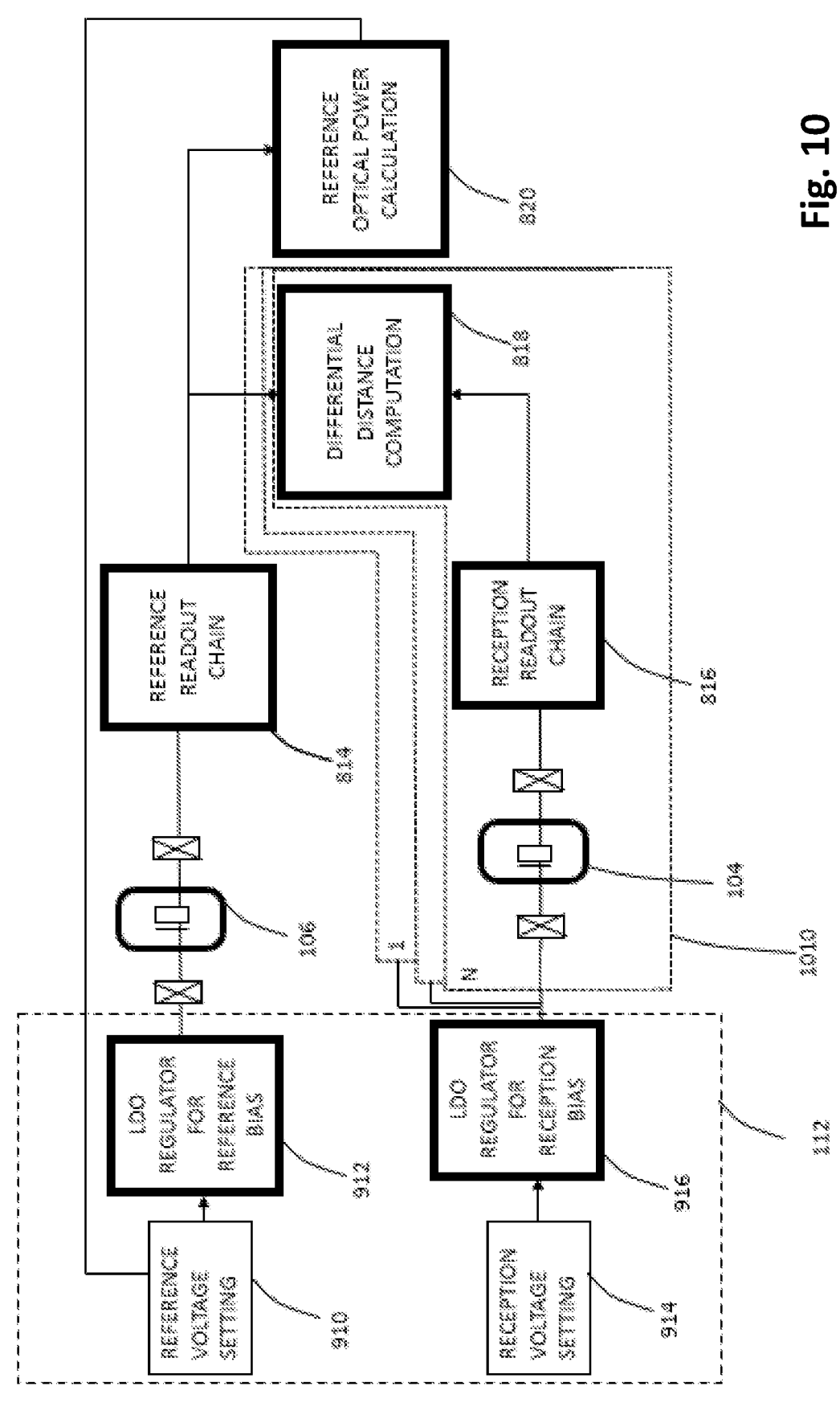
FIG. 10 is a block diagram illustrating functional blocks of the optoelectronic device of FIG. 4, 5 or 6 according to another method of use of the optoelectronic device.

FIG. 10 is a block diagram illustrating functional blocks of the optoelectronic device of FIG. 4, 5 or 6 according to another method of use of the optoelectronic device 400, 500, or 600.

The example of FIG. 10 is similar to the example of FIG. 9, except that the regulated bias voltage generated by the LDO regulator 916 is supplied to multiple arrays 1010 (1 to N) of pixels 230 of the signal reception sensor 104. This allows multiple zone, or multi-zone, imaging.

Figure 11:
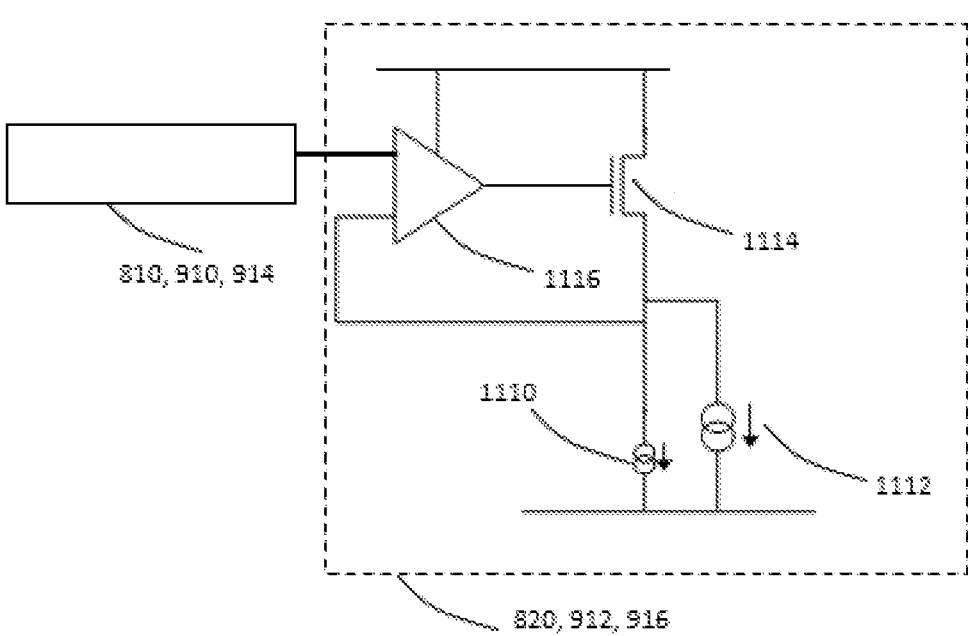
FIG. 11 is an example embodiment of the voltage bias regulator of FIG. 7, 8 or 9.
Figure 11:
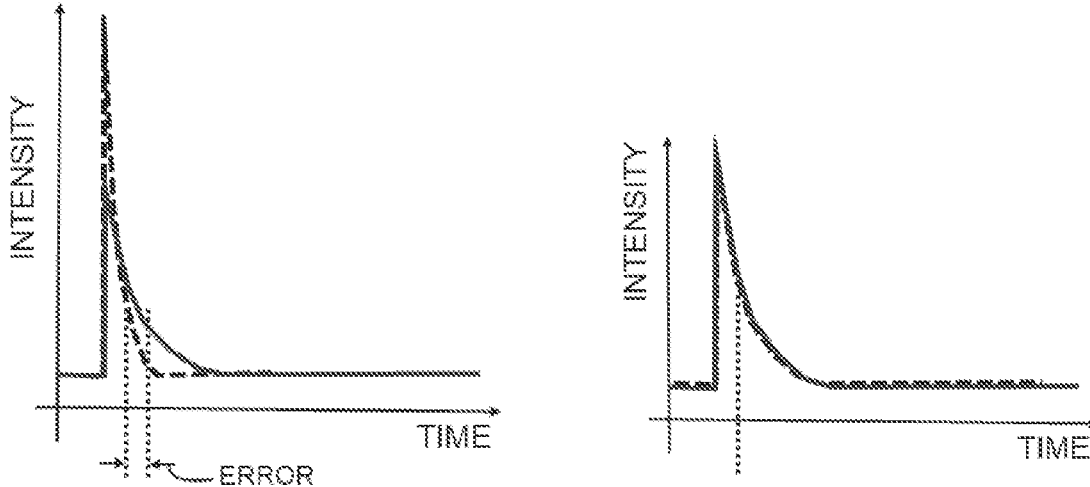

FIG. 11 schematically illustrates an example embodiment of the LDO regulators 820, 912, 916 of FIGS. 8 to 10.

The LDO regulators 820, 912, 916 of the example of FIG. 11 comprise, for example, an operational amplifier 1116 receiving on its non-inverting input the voltage setting 810, 910, 914 for the reference sensor 106 and/or for the signal reception sensor 104. The operational amplifier 1116 is for example coupled to a supply voltage rail via which it is powered. The output of the operational amplifier 1116 is coupled to the gate of a transistor 1114. The source of the transistor 1114 is coupled to the supply voltage rail. The drain of the transistor 1114 provides the regulated bias voltage at the output of the LDO regulator 820, 912, 916. Furthermore, the train of the transistor 1114 is coupled to the inverting input of the operational amplifier 1116.

In the example of FIG. 11, a current source 1110 is coupled between the drain of the transistor 1114 and a ground voltage rail, and provides a load to the transistor 1114 that does not depend on the amount of light received by the sensor(s). A further current source 1112 represents the load of the signal reception sensor 104 and/or of the reference sensor 106, which depends on the amount of light received by the signal reception sensor 104 and/or by the reference sensor 106.

FIG. 12 is a graph illustrating time domain pile up distortion. In particular, FIG. 12 illustrates, with a solid curve, the signal intensity (INTENSITY) received by the signal reception sensor 104 as a function of time, and with a dashed curve, the signal intensity received by the reference sensor as a function of time. It is assumed that an object is at zero distance, and thus the signal reception sensor should receive the pulse at the same time as the reference sensor. However, due to a high signal level, there is time-domain distortion, leading to a cropping of the reference pulse. A mean or median level of the pulse detected by the reference sensor is thus offset by a time error (ERROR) with respect to that of the pulse received by the signal reception sensor.

FIG. 13 is a graph illustrating mitigation of time domain pile up distortion. In particular, the graph of FIG. 13 is similar to the one of FIG. 12, but illustrates a case in which the bias voltage of the reference sensor 106 is adjusted independently of the bias voltage of the signal reception sensor 104, thereby avoiding saturation of the reference sensor, and avoiding the time domain distortion.

Various embodiments and variants have been described. Those skilled in the art will understand that certain features of these embodiments can be combined and other variants will readily occur to those skilled in the art. In particular, the control circuit 112 of FIG. 4 is, for example, implemented in the device substrates 406, 410 instead of the base substrate. In another example, the control circuit 112 of the FIG. 5 is, for example implemented in the base substrate instead of the device substrate. In yet another example, the control circuits 112, 612 of FIG. 6 are, for example implemented in the base substrate 122 instead of inside the device substrate 410, 606.

In another example, the reception voltage setting 914 is further regulated, for example, according to the signal reception readout values.

Finally, the practical implementation of the embodiments and variants described herein is within the capabilities of those skilled in the art based on the functional description provided hereinabove. In particular, the regulation of the bias voltage may be implemented with other circuits. Furthermore, the time-of-flight computation 818 may be implemented with different methods, for example based on either direct TOF or indirect TOF methods.

Each of the devices 100, 300, 400, 500 and 600 is for example a face-ID sensor, in other words a device configured to identify a face.

The devices 100, 300, 400, 500, 600 are for example implemented under a touch display screen of a mobile communication device, for example an organic light emission diode (OLED) touch screen. If the semiconductor nanoparticles are designed to operate in SWIR domain, then light emitted by the light emitter 108, or return light, are not, or partially, absorbed by the touch screen especially if the touch screen is based on OLED. This has the advantage of avoiding the generation of a white spot on the screen.

The optoelectronic devices 100, 300, 400, 500, 600 are, for example, implemented in a medical, health, or wellness sensor for example to detect the deformation movement of blood vessels.

The invention claimed is:

1. A time-of-flight sensor, comprising, on a same base substrate:
   a light emitter configured to emit light into an image scene;
   a reference sensor configured to detect light emitted by the light emitter; and
   a signal reception sensor array separated from the light emitter by an optical barrier;
   wherein the signal reception sensor array and the reference sensor each comprise a matrix of pixels, each pixel having a first electrode and a second electrode;
   wherein the light emitter is based on semiconductor nanoparticles;
   wherein each of the reference sensor and each sensor of the signal reception sensor array comprises a layer of semiconductor nanoparticles, a hole transport layer, an electron transport layer and electrodes;

wherein the optical barrier is configured to prevent light emitted by the light emitter from directly reaching the signal reception sensor array;
   wherein the signal reception sensor array is configured to detect light reflected by the image scene; and
   wherein the first electrodes of the pixels of the signal reception sensor array and of the reference sensor comprise a partially transparent and conductive layer common to each of the pixels, the second electrodes being insulated from the second electrode of each other pixel of the signal reception sensor array and of the reference sensor.

2. The time-of-flight sensor according to claim 1, wherein the light emitter is a vertical-cavity surface-emitting laser.

3. The time-of-flight sensor according to claim 1, wherein the signal reception sensor array comprises a plurality of pixels, and wherein the reference sensor and each pixel of signal reception sensor array has its layer of semiconductor nanoparticles formed of InSb, $InAs_xP_x$ or InAs or $InAs_xSb_x$.

4. The time-of-flight sensor according to claim 1, wherein the hole transport layer comprises molybdenum oxide and the electron transport layer comprises zinc oxide.

5. A time-of-flight sensor, comprising, on a same base substrate:
   a light emitter configured to emit light into an image scene;
   a reference sensor configured to detect light emitted by the light emitter; and
   a signal reception sensor array separated from the light emitter by an optical barrier;
   wherein the reference sensor comprises a matrix of pixels, each pixel having a first electrode and a second electrode;
   wherein the light emitter is based on semiconductor nanoparticles;
   wherein each of the reference sensor and each sensor of the signal reception sensor array comprises a layer of semiconductor nanoparticles, a hole transport layer, an electron transport layer and electrodes;
   wherein the optical barrier is configured to prevent light emitted by the light emitter from directly reaching the signal reception sensor array;
   wherein the signal reception sensor array is configured to detect light reflected by the image scene; and
   wherein the first electrodes of the pixels of the reference sensor comprises a partially transparent and conductive layer common to each of the pixels, the second electrodes being insulated from the second electrode of each other pixel of the reference sensor.

6. The time-of-flight sensor according to claim 1, wherein the partially transparent and conductive layer is common to both the signal reception sensor array and the reference sensor.

7. The time-of-flight sensor according to claim 6, wherein the reference sensor comprises a first device substrate and the signal reception sensor array comprises a second device substrate, the first and second device substrates being mounted on the base substrate.

8. The time-of-flight according to claim 1, wherein the partially transparent and conductive layer of the signal reception sensor array and of the reference sensor are independently adjustable from each other and are insulated from each other; and further comprising at least one polarization circuit configured to apply a first voltage between the first electrode and the second electrode of pixels of the reference sensor and apply a second voltage between the first electrode and the second electrode of the pixels of the signal reception sensor array, the first voltage being different from the second voltage.

9. A mobile communication device comprising a touch display screen and comprising a time-of-flight sensor according to claim 1, wherein the touch display screen covers the time-of-flight sensor.

10. The mobile communication device of claim 9, wherein the touch display screen is an organic light emission diode display.

11. A face identification sensor comprising a time-of-flight sensor according to claim 1.

12. A method of using a sensor to measure a time-of-flight, the sensor comprising on a same base substrate a light emitter configured to emit light into an image scene, a reference sensor configured to detect light emitted by the light emitter, and a signal reception sensor array separated from the light emitter by an optical barrier, wherein the signal reception sensor array and the reference sensor each comprise a matrix of pixels, each pixel having a first electrode and a second electrode, wherein the light emitter is based on semiconductor nanoparticles, wherein each of the reference sensor and each sensor of the signal reception sensor array comprises a layer of semiconductor nanoparticles, a hole transport layer, an electron transport layer and electrodes, wherein the optical barrier is configured to prevent light emitted by the light emitter from directly reaching the signal reception sensor array, wherein the signal reception sensor array is configured to detect light reflected by the image scene, and wherein the first electrodes of the pixels of the signal reception sensor array and of the reference sensor comprise a partially transparent and conductive layer common to each of the pixels, the second electrodes being insulated from the second electrode of each other pixel of the signal reception sensor array and of the reference sensor, the method comprising:

applying, by a polarization circuit, a first voltage between the first electrode and the second electrode of the pixels of the reference sensor and applying a second voltage between the first electrode and the second electrode of the pixels of the signal reception sensor;

and modifying the first voltage as function of a signal output of the reference sensor.

13. The method of claim 12, wherein the hole transport layer comprises molybdenum oxide and/or the electron transport layer comprises zinc oxide.

14. The method of claim 12, further comprising modifying the second voltage as function of a signal output of the signal reception sensor.

15. The method of claim 14, wherein the second voltage is different from the first voltage.

16. A method of using a sensor to measure a time-of-flight, the sensor comprising on a same base substrate a light emitter configured to emit light into an image scene, a reference sensor configured to detect light emitted by the light emitter, and a signal reception sensor array separated from the light emitter by an optical barrier, wherein the signal reception sensor array and the reference sensor each comprise a matrix of pixels, each pixel having a first electrode and a second electrode, wherein the light emitter is based on semiconductor nanoparticles, wherein each of the reference sensor and each sensor of the signal reception sensor array comprises a layer of semiconductor nanoparticles, a hole transport layer, an electron transport layer and electrodes, wherein the optical barrier is configured to prevent light emitted by the light emitter from directly reaching the signal reception sensor array, wherein the signal reception sensor array is configured to detect light reflected by the image scene, and wherein the first electrodes of the pixels of the signal reception sensor array and of the reference sensor comprise a partially transparent and conductive layer common to each of the pixels, the second electrodes being insulated from the second electrode of each other pixel of the signal reception sensor array and of the reference sensor, the method comprising:

applying, by a polarization circuit, a first voltage between the first electrode and the second electrode of the pixels of the reference sensor and applying a second voltage between the first electrode and the second electrode of the pixels of the signal reception sensor; and modifying the second voltage as function of a signal output of the signal reception sensor.

17. The method of claim 16, wherein the hole transport layer comprises molybdenum oxide and/or the electron transport layer comprises zinc oxide.

18. The method of claim 16, wherein the second voltage is different from the first voltage.

* * * * *